W. H. RAMALEY.
HEATER.
APPLICATION FILED JAN. 13, 1908.
901,829.
Patented Oct. 20, 1908.
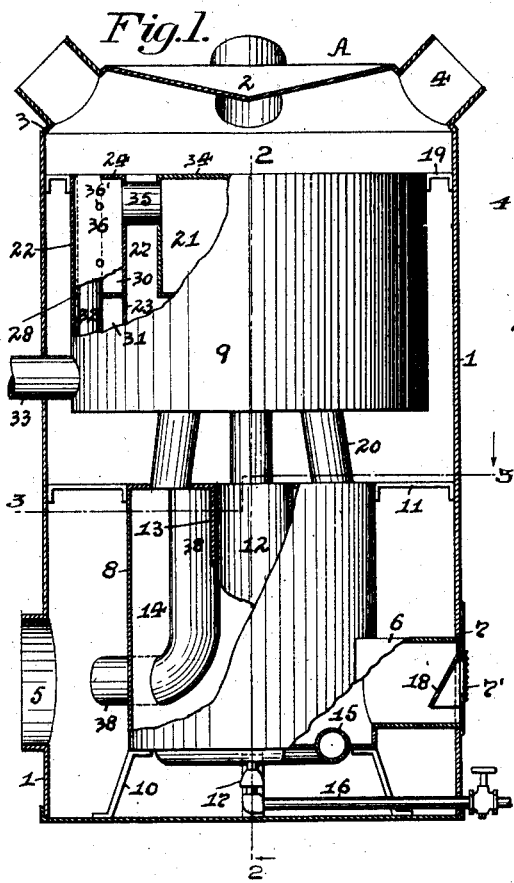
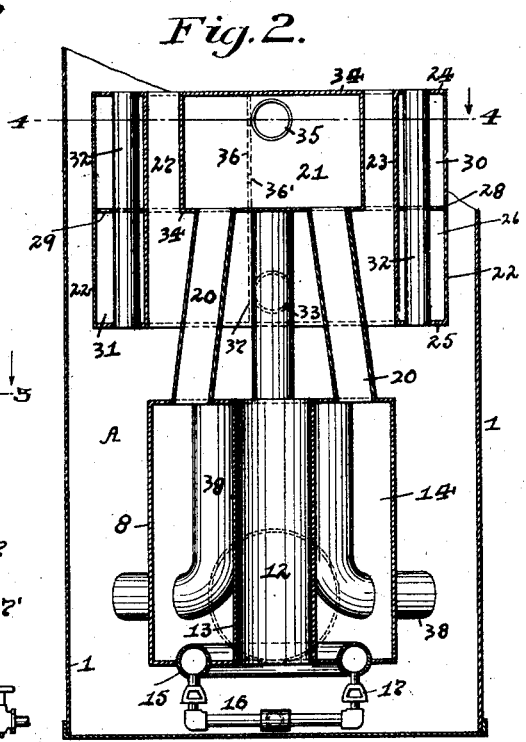
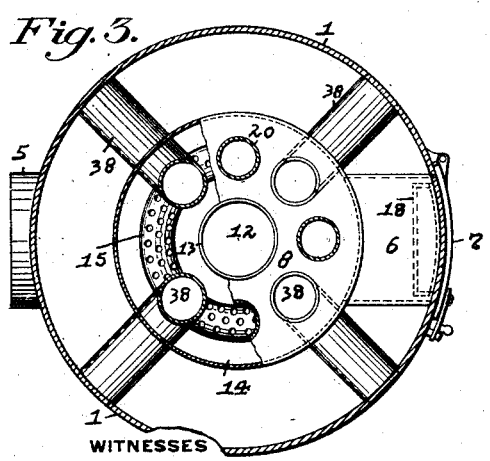
WITNESSES
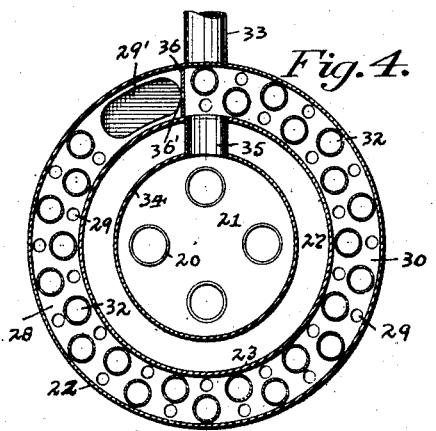
INVENTOR

UNITED STATES PATENT OFFICE.

WILLIAM H. RAMALEY, OF BEN AVON, PENNSYLVANIA, ASSIGNOR OF ONE-FOURTH TO CHARLES E. DOELL AND ONE-FOURTH TO PETER M. McVAY, OF PITTSBURG, PENNSYLVANIA.

HEATER.

No. 901,829.     Specification of Letters Patent.     Patented Oct. 20, 1908.

Application filed January 13, 1908. Serial No. 410,519.

*To all whom it may concern:*

Be it known that I, WILLIAM H. RAMALEY, a resident of Ben Avon, in the county of Allegheny and State of Pennsylvania, have invented a new and useful Improvement in Heaters; and I do hereby declare the following to be a full, clear, and exact description thereof.

My invention relates to heaters and has special reference to that class of heaters shown in United States Letters Patent granted to William H. Ramaley and William E. Lamerton on January 30, 1906, No. 811,335, in which cold air is taken into the heater to be heated for use in rooms or apartments.

The object of my invention is to provide such a construction of heater which is cheap, simple and efficient in its construction and operation and will have a large area of heat radiating surfaces, as well as one whereby a large amount of cold air can be taken into the same and be quickly and effectually heated to the desired temperature.

A still further object of my invention is to provide such a heater in which the products of combustion are carried completely around the same in a circular path, so that the full benefit of the heating power thereof can be derived therefrom prior to the escape of said products from the heater.

My invention consists, generally stated, in the novel arrangement, construction and combination of parts, as hereinafter more specifically set forth and described, and particularly pointed out in the claim.

To enable others skilled in the art to which my invention appertains, to construct and use my improved heater, I will describe the same more fully, referring to the accompanying drawing, in which:—

Figure 1 is a side elevation of my improved heater, with the outer casing thereof shown in vertical section and with some of the parts broken away. Fig. 2 is a vertical central section of the same taken on the line 2—2 Fig. 1 and looking in the direction of the arrow. Fig. 3 is a cross-section of the heater on the line 3—3 Fig. 1 looking in the direction of the arrow. Fig. 4 is a like view of the same on the line 4—4 Fig. 2 looking in the direction of the arrow.

Like symbols of reference herein indicate like parts in each of the figures of the drawing.

As illustrated in the drawing A represents my improved heater, formed of sheet metal, with the annular inclosing shell or casing 1 having the top 2 extending over the same which is provided with the inclined sides 3, and from which a plurality of flues 4 lead for conveying the heated air from said heater to the different compartments to be heated. Adjacent to the bottom of the casing 1 is the cold air inlet or duct 5 which leads into the said casing and opposite said duct and leading through said casing and into the burner casing for forming the combustion chamber, as hereinafter described, is the chute 6, which has a door 7 fitted to the outer end of the same and exterior of the casing 1 for access to the combustion chamber in the interior of said burner casing.

Mounted within the casing 1 is the burner casing 8 and a heating casing 9, the burner casing being annular in form and supported within the casing 1 by the legs 10 at its lower end, while its upper end is supported and braced within said casing 1 by the rods 11. The burner casing 8 is provided with a central chamber 12 extending through the same which is formed by the casing or cylinder 13 within said casing and forms with the said casing the circular or annular combustion chamber 14 around the same. Within the bottom of the chamber 14 is the perforated burner 15 for the burning of gaseous fuel within said chamber and to this burner are connected the feed pipes 16, which are provided with the usual air mixers 17 thereon and lead from the outside of the casing 1 where they are connected to the usual main supply pipe leading from any suitable source of supply. The burner 15 can be ignited from without the casing 1 through the medium of the door 7 and chute 6, and air is fed into the combustion chamber 14 and over said burner through a gauzed opening 7' in the door 7, which air is deflected into and along the lower part of the chute 6 by a plate 18 connected to said door and set at an incline in said chute.

The heating casing 9 is mounted above the burner casing 8 and is supported from the casing 1 by the rods 19 connecting the upper end of said casing 9 and the casing 1, as well as by the flues 20, which connect the upper end of the burner casing 8 and lead inwardly at an angle from the combustion chamber 14 for being connected to the inner heating chamber 21 within said heating casing 9, as hereinafter described.

The heating chamber is preferably annular in cross-section and is formed by the casing 9 which is composed of the outer wall 22 and inner wall 23 connected together by the top and bottom walls 24 and 25 for forming the circular heating chamber 26 between them and the cylindrical air chamber 27 within the wall 23. Within the chamber 26 is the horizontal partition wall 28 which is located centrally of the same and is provided with a series of openings 29 and an enlarged opening or passage-way 29' within the same whereby the contents of the upper heating compartment 30 formed in said chamber above said partition wall can pass into the lower compartment 31 on the opposite side of said partition, while said openings 29 can be of different size and of different numbers and arrangement in the partition 28 according to the size of the furnace. A series of flues 32 are arranged vertically through the compartments 30 and 31 and partition 28, such flues extending from the bottom wall 25 to the top wall 24 of the chamber 26 and being preferably staggered within the same.

The lower compartment 31 of the chamber 26 is provided with an escape or exhaust-flue 33 to carry the products of combustion outside of the heater A after the full benefit has been derived from the same, and such flue leads from the outer wall 22 of the casing 9 through the casing 1. Centrally supported within the air chamber 27 of the heating chamber is a cylindrical casing 34 for forming the heating chamber 21, with which the combustion chamber 14 communicates by means of the flues 20, and such casing communicates with the upper heating compartment 30 through a pipe 35. A flue-strip 36 having openings 36' therein is arranged vertically within the upper heating compartment 30 and between the opening 29' in the partition 28 and the pipe 35 for directing the products of combustion around said compartment in one direction, which products can also meet with same passing through the openings 36' in the strip 36, and so they can pass down through the openings 29 and 29' in the partition 28. A flue-strip 37 is arranged in a like plane with the strip 36 in the lower compartment 31 for directing said products entering said compartment through the openings 29 and 29' to pass in an opposite direction around said compartment and escape through the flue 33.

Extending through the casing 1 and burner casing 8 are the cold air flues 38 which extend up within the combustion chamber 14 and to the top of the casing 8 forming said chamber and between the flues 20.

When my improved heater A is in operation, the products of combustion pass from the combustion chamber 14 upwardly through the flues 20 to the casing 34, thence through the pipe 35 into the upper compartment 30, thence they pass around the compartment 30 and downwardly into the compartment 31 through the openings 29 and 29' in the partition 28, and thence they pass around the compartment 31 and escape through the exhaust-flue 33 to the chimney. The cold air entering the inlet 5 strikes against the burner casing 8 and may either pass around this casing or upwardly through the chamber 12 of the cylinder 13, around the flues 20 and the heating chamber, as well as passing upwardly through the flues 32 to the top 2 of the casing 1; and then such air which has become heated by contact with the heated surfaces of the casings passes out through the flues 4 to the rooms or apartments to be heated. The other cold air entering the flues 38 passing through the casing 1 and combustion chamber 14 will pass out of the same at the top of the casing 8 and mingle with the other air from the inlet 5 passing up around and within said casing 8 and pass up with the same to the flues 4 in the manner above described.

It will thus be seen that my improved heater will provide for an unusual quantity of cold air to be taken into the same and heated therein for use, and such air will be thoroughly and properly heated for the purpose intended, while all parts of the heater will be thoroughly and properly heated for such air through the novel arrangement and construction of the parts for the passage of the products of combustion through the same.

It will also be obvious suitable means, such as dampers may be used in connection with the heater for controlling the air supplied to the inlet and flues, and the constructions can be used in various other forms, such as stoves, furnaces, etc., while fuel other than gas can be used for operating the same.

Various modifications and changes in the design, construction and operation of my improved heater may be resorted to without departing from the spirit of the invention or sacrificing any of its advantages.

What I claim as my invention, and desire to secure by Letters Patent, is:—

In a heater, the combination of a casing having an air inlet and flues leading from said casing, a burner chamber and a heating chamber in said casing, flues between said chambers, a partition having openings therein within said heating chamber for forming heating compartments therein, and vertical straightway flues passing through said partition and compartments, and a flue-strip in each of said compartments and one of said strips having openings therein.

In testimony whereof, I, the said WILLIAM H. RAMALEY have hereunto set my hand.

WILLIAM H. RAMALEY.

Witnesses:
J. N. COOKE,
JAMES L. WEHN.